Dec. 5, 1967 W. E. ARNOLDI 3,355,860
THREE CANISTER REGENERATIVE $CO_2$ SYSTEM
Filed Feb. 18, 1965 2 Sheets-Sheet 1

STAGE 1
ADSORB $H_2O + CO_2$ : A
DESORB $H_2O$ : B
EXH. $CO_2$ : C

STAGE 2
ADSORB $H_2O + CO_2$ : B
DESORB $H_2O$ : C
EXH. $CO_2$ : A

INVENTOR
WALTER E. ARNOLDI
BY M. B. Tacker
ATTORNEY

Dec. 5, 1967     W. E. ARNOLDI     3,355,860

THREE CANISTER REGENERATIVE CO₂ SYSTEM

Filed Feb. 18, 1965     2 Sheets-Sheet 2

INVENTOR
WALTER E. ARNOLDI
BY ATTORNEY

United States Patent Office 3,355,860
Patented Dec. 5, 1967

3,355,860
**THREE CANISTER REGENERATIVE
$CO_2$ SYSTEM**
Walter E. Arnoldi, West Hartford, Conn., assignor to
United Aircraft Corporation, East Hartford, Conn., a
corporation of Delaware
Filed Feb. 18, 1965, Ser. No. 433,633
6 Claims. (Cl. 55—31)

This invention relates to air purification systems and more particularly to carbon dioxide removal systems of the adsorption type for removal of carbon dioxide from sealed compartments subject to carbon dioxide contamination due to exhalation of human occupants.

The system of this invention is useful in controlling the carbon dioxide level in airplane cabins and other closed compartments having human occupants, but was developed specifically for controlling the carbon dioxide level in manned space ships which may undertake protracted missions.

It is therefore an object of this invention to provide an improved system of the type described capable of maintaining the carbon dioxide level in a closed compartment at a tolerable level over long periods of time.

It is another object of this invention to provide such a system which is relatively simple, extremely reliable in operation and which is capable of operation over long periods of time.

More specifically the present invention provides three canisters containing an artificial zeolite, sometimes referred to as molecular sieves, or microtraps, each having two outlets and two inlets. Each outlet and each inlet is controlled by a normally closed valve. These valves may be operated by rotary actuators or they may be of the solenoid operated type and are governed by a suitable electric controller to provide the desired cycling of the valves.

The cycle is carried out in three stages during which the moist $CO_2$ contaminated air from the space ship compartment is introduced successively into the three canisters wherein $H_2O$ and $CO_2$ are adsorbed from the air. At the same time that adsorption of $H_2O$ and $CO_2$ is taking place in one canister, desorption of $CO_2$ is taking place in another canister and desorption of $H_2O$ is taking place in still another canister and the $CO_2$ free air with its moisture restored is being returned to the compartment.

It is a further object of this invention to provide a system as above described for the removal of $CO_2$ for a closed compartment.

Other objects of this invention are to use the effluent air from the $H_2O$ and $CO_2$ adsorbing canister to accomplish the desorption of $H_2O$ from the second canister; and to cycle the heat from the first canister through the second and third canisters and back to the first canister, so that once the system has been put into operation only enough heat will need to be added to make up for the normal heat losses in the system.

These and other objects and advantages of the system will be evident or will be pointed out in connection with the following detailed description of a preferred embodiment of the invention shown in the accompanying drawings.

Figure 1:
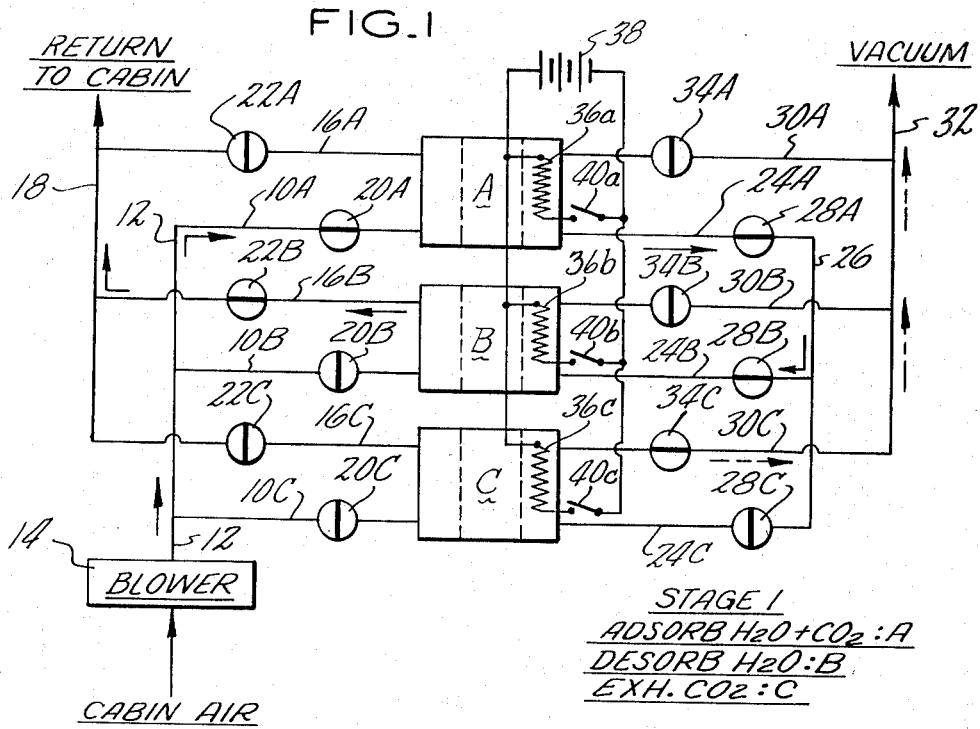
FIG. 1 shows schematically the improved $CO_2$ removal system of this invention, the valves being shown in the first of three stages of the cycle.

Referring to FIG. 1, three identical canisters A, B and C are provided which contain artificial zeolite, capable of absorbing large quantities of $H_2O$ and $CO_2$. Since the three molecular sieve canisters A, B and C are identical and have identical valving, only canister A and its valves will be described in detail.

On its first, or inlet, end, which is the left-hand end in FIG. 1, canister A has an inlet duct 10A connected with a duct 12 from a blower 14 that supplies all the canisters with cabin air from the space ship. This end of canister A also has an outlet duct 16A that is connected with a duct 18 by which air is returned to the cabin. Duct 10A has in it a two-position valve 20A which may be a normally closed solenoid valve. In duct 16A a similar two-position valve 22A is provided. On its second, or right-hand, end, canister A has a duct 24A that is connected to a duct 26 which is common to all the canisters. Duct 24A has a two-position valve 28A. Canister A also has on its right-hand end a duct 30A which is connected to a vacuum duct 32. This latter duct may, in the case of a space ship, be simply discharged into space. Duct 30A is provided with a valve 34A which, like all the valves in FIG. 1, is a two-position, closed or open valve.

Figure 3:
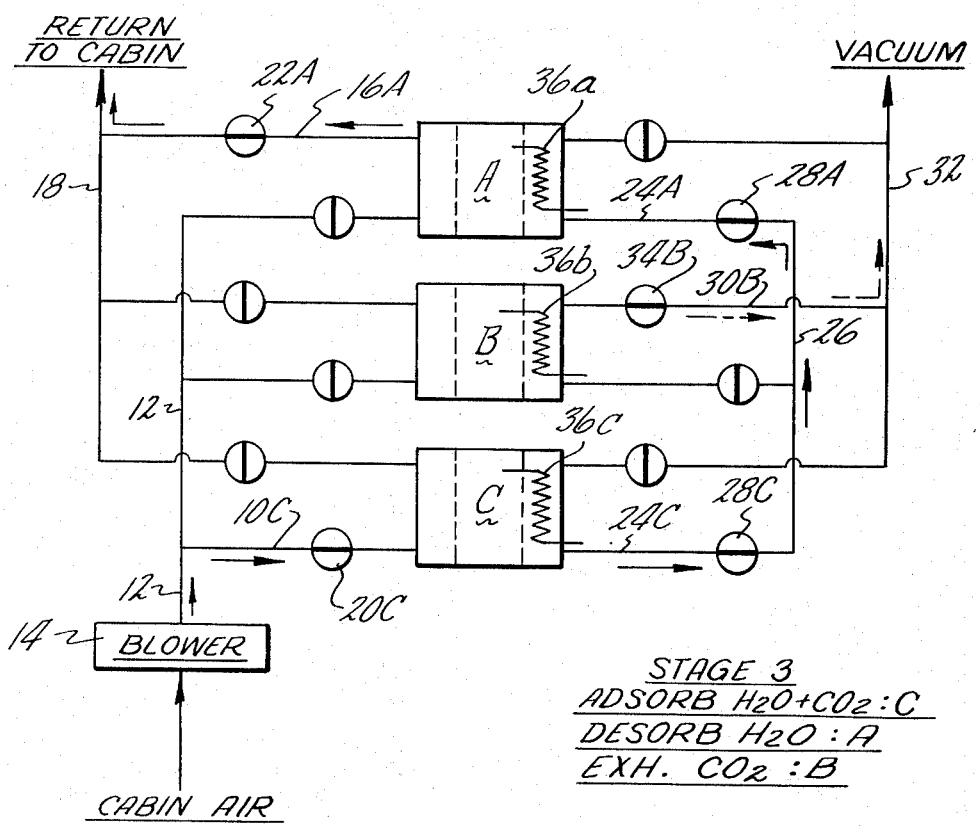
FIG. 3 shows the same system with the valves in the positions they occupy in the third and last stage of the cycle.

Canister A is also provided with a heating element 36a for heating air entering the canister through duct 24A from duct 26 (FIG. 3). Heating element 36a receives its power from a battery 38 and is controlled by a switch 40a, here shown diagrammatically as a manually operated switch. It will be understood that the valves and the heater switches of FIG. 1 are automatically operated in the proper sequence and for the proper time to correctly cycle the heat supplied to the canisters by the heaters and open the valves, as hereinafter described. This may be done by any one of a number of well-known mechanisms. For example, a drum controller can be used having peripheral arcuate contact strips which are engaged by brushes as the drum rotates through one revolution to energize and open the normally closed valves in the proper sequence and for the proper time and to energize the heater elements as required.

Figure 2:
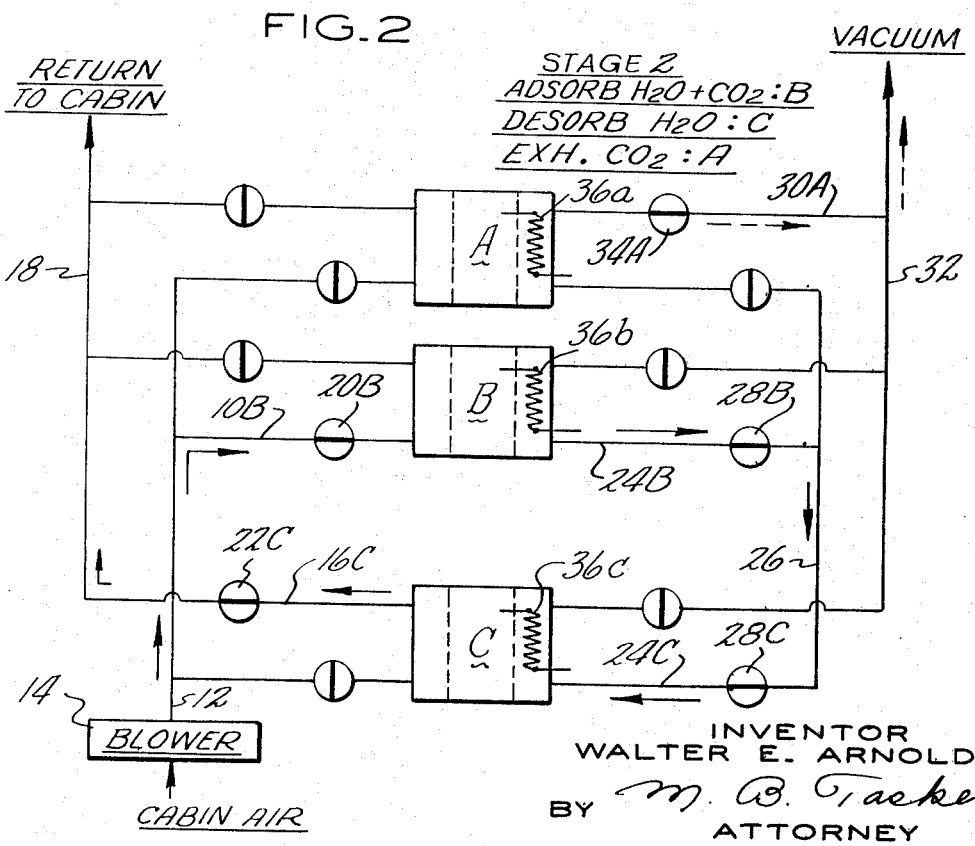
FIG. 2 shows the same system with the valves in the positions they occupy in the second stage of the cycle.

Canisters B and C are identical in features described for canister A above and have identical valve controlled connections with ducts 12, 18, 26 and 32. Their connecting ducts and valves are accordingly numbered by the same convention except that they also bear individual letter designations. FIGS. 2 and 3 are identical with FIG. 1 except for the positions of the various valves and, for simplification, the omission of the heater circuits.

In the first stage of the cycle shown in FIG. 1, canister A is the adsorbing canister and valves 20A, 28A, 28B, 22B and 34C are energized, as shown, to open them. All other valves remain closed. Contaminated air from the cabin is led through the system under pressure from the blower 14, first entering duct 12. Since valve 20A is open, $CO_2$ contaminated air enters canister A through duct 10A and valve 20A and slowly passes through the crystalline zeolite bed of the canister where it loses its $H_2O$ and $CO_2$ content by adsorption and passes out through duct 24A to duct 26. The air from canister A, heated by residual heat in canister A from a previous cycle and also by heat into adsorption of $CO_2$, passes through duct 26 and valve 28B into canister B. Upon entering canister B, the air is further heated to a temperature necessary for desorption of moisture from canister B by heater 36b, which is energized by the closing of its switch 40b. The air as it passes through the bed of canister B picks up $H_2O$ and then passes through duct 16B and open valve 22B to duct 18 by which it is returned to the cabin with its normal moisture content intact. The path of the air above described is indicated in FIG. 1 by full line arrows.

During the time that $H_2O$ and $CO_2$ are being adsorbed in canister A and $H_2O$ is being desorbed in canister B, canister C is connected by duct 30C and open valve 34C to duct 32 which leads to an evacuated container. Thus while the FIG. 1 stage of the cycle is in progress, $CO_2$ left in canister C by a previous cycle is exhausted and discharged as indicated by the broken line arrows.

FIG. 2 shows the second stage of the cycle. Here valves 20B, 22C, 34A, 28B and 28C are open and air from blower 12, as indicated by the full line arrows, flows through ducts 12 and 10B and valve 20B to canister B. After passing through the canister, in which its $H_2O$ and $CO_2$ content is adsorbed, it leaves through duct 24B and valve 28B. It should be noted here than canister B was previously heated during stage 1 by the hot air which was heated by residual heat from canister A and by heater 36b. This heat in canister B is removed by the cabin air entering canister B and is carried into canister C. Heater element 36c will be energized to heat the air entering canister C, thereby replacing any heat lost in the first stage of the cycle. As the air moves through the zeolite bed of the canister C it desorbs $H_2O$ and returns to the cabin through duct 16C, open valve 22C and duct 18 with its normal $H_2O$ content and free from $CO_2$. Simultaneously with this stage of the cycle just described valve 34A is open to allow $CO_2$ in canister A to be exhausted through ducts 30A and 32.

In the final stage of the cycle illustrated in FIG. 3, valves 20C, 28C, 28A, 22A and 34B are open. This permits cabin air from blower 14 to flow through ducts 12 and 10C, and valve 20C into canister C where $H_2O$ and $CO_2$ are adsorbed. The air leaves by duct 24C, valve 28C, duct 26, valve 28A and duct 24A leading to canister A where $H_2O$ left by stage 1, FIG. 1, of the cycle is desorbed from the zeolite bed. The air entering canister A is heated by energizing heater 36a. The moist air then leaves canister A and returns to the cabin through duct 16A, valve 22A and duct 18.

Canister B is connected to vacuum through duct 30B, valve 34B and duct 32 through which its $CO_2$ content is exhausted. This completes one full cycle of operation which is repeated indefinitely as long as the ship remains in space. It should be noted here that the adsorbing, desorbing and evacuating times are the same. This time is determined by the length of time it takes the heat front to pass through the length of the zeolite bed.

From the above description of a full cycle of the system it will be evident that an automatic de-contamination system has been provided which requires fewer canisters than previous systems. It will also be evident that the system is simple and reliable in operation.

An outstanding feature of this invention will be evident from considering, for example, stage three of the above described cycle. Since air entering canister C from the cabin is heated during adsorption in canister C, in the process of cooling a previously hot bed in this canister, this heat contributes to the requirement for desorbing $H_2O$ from canister A into which the effluent from canister C flows, thus performing a partial conservation of heat. As a result, no additional heat exchangers are required for conservation of heat.

A further outstanding feature of the system of this invention is its conservation of $H_2O$ which is returned to the cabin with the decontaminated air. Also, since the adsorbing time equals the desorbing time, the heat can be cycled from canister A to canister B to canister C to canister A with a minimum energy input.

While only one embodiment of the invention has been shown and described, it will be evident that various changes may be made in the construction and arrangement of the parts without exceeding the scope of the invention as defined by the following claims.

I claim:

1. Apparatus for removing $CO_2$ from cabin air comprising three molecular-sieve canisters, each having an air inlet connection on the first end of each canister, a first outlet connection on the first end of each canister, a second outlet connection on the second end of each canister, and a fourth intercanister connection on the second end of each canister, a two-position open or closed valve in each of said connections, means for supplying cabin air to all of said inlet connections, duct means for connecting all of said first outlet connections to the cabin, duct means for connecting all of said second outlet connections to vacuum, and duct means common to all three of said canisters for connecting said fourth intercanister connections.

2. Apparatus for removing $CO_2$ from a sealed compartment subject to $CO_2$ contamination due to exhalation of a human occupant comprising three molecular-sieve canisters, means including a blower for exhausting contaminated air from the compartment, and means for selectively linking any two of said three canisters in series between the outlet of said blower and said compartment including duct connections from the first end of each canister to the outlet of said blower, duct connections from the first end of each canister to the compartment, duct connections from the second end of each canister to vacuum, a duct common to all three canisters having a canister linking duct connection to the second end of each of said canisters, and a two-position normally closed valve in each of said duct connections.

3. The three stage method of operating a three canister regenerative $CO_2$ system for cabin air purification which includes in the first stage the steps of circulating $H_2O$ and $CO_2$ laden air from the cabin through the first of the three canisters to adsorb the $H_2O$ and $CO_2$ content of the air, returning the air from the first canister through the second canister to desorb the $H_2O$ content of said second canister, returning the moist air from said second canister to the cabin, and simultaneously connecting the third canister to vacuum; in the second stage circulating $H_2O$ and $CO_2$ laden air from the cabin through the second canister to adsorb the $H_2O$ and $CO_2$ content of the air, returning the air to the cabin through the third canister to adsorb the $H_2O$ content of said third canister, and simultaneously connecting the first canister to vacuum to exhaust its $CO_2$ content; and in the third stage circulating the $H_2O$ and $CO_2$ laden air from the cabin through the third canister to adsorb the $H_2O$ and $CO_2$ content of the air, passing the air from the third canister through the first canister to desorb the $H_2O$ content of the first canister, returning the moist air from the first canister to the cabin, and simultaneously connecting the second canister to vacuum to exhaust the $CO_2$ content of the second canister.

4. The steps of removing $CO_2$ from cabin air by a three-stage method using three canisters of the type containing regenerable solid adsorbent, which consists in the first stage in simultaneously supplying cabin air to one of the canisters for adsorption of $H_2O$ and $CO_2$, discharging the air from said one canister into a second canister for desorption of the $H_2O$ in that canister, discharging the air from the second canister with its moisture content back to the cabin, and connecting a third canister to vacuum to discharge $CO_2$ therefrom; in the second stage simultaneously supplying air from the cabin to the second canister for adsorption of $H_2O$ and $CO_2$, discharging the air from said second canister into the third canister to desorb $H_2O$, discharging the air from the third canister with its moisture content to the cabin, and connecting the first canister to vacuum to exhaust its $CO_2$ content; and in the third stage admitting air from the cabin to the third canister for adsorption of $H_2O$ and $CO_2$, discharging the air from the third canister through the first canister to desorb $H_2O$ and thence with its moisture content back to the cabin, and connecting the second canister to vacuum to exhaust its $CO_2$ content; and repeating the cycle through these three stages continuously.

5. The method of claim 4 in which in the first stage of the cycle heat is supplied to the air as needed as it enters said second canister, and heat is supplied in the second and third stages of the cycle to the air as it enters said third and first canisters respectively.

6. The three-stage method of operating a three-canister regenerative $CO_2$ system for cabin air purification in which the canisters contain a regenerable solid adsorbent of artificial zeolite, which includes in the first stage the steps of circulating $H_2O$ and $CO_2$ laden air from the cabin through the first of the three canisters to adsorb the $H_2O$ and $CO_2$ content of the air in the canister, returning the heated air from the first canister through the second canister to the cabin, heat being added to the air as it enters the second canister, to desorb $H_2O$ in said second canister, and simultaneously connecting the third canister to vacuum to exhaust any $CO_2$ therein; in the second stage circulating $H_2O$ and $CO_2$ laden air from the cabin through the second canister to adsorb $H_2O$ and $CO_2$ in the air, returning the air from the second canister to the cabin through the third canister to desorb $H_2O$ in said third canister, heat being added to the air entering the third canister if needed to replace the heat lost in the system, and simultaneously connecting the first canister to vacuum to exhaust its $CO_2$ content; and in the third stage circulating $H_2O$ and $CO_2$ laden air from the cabin through the third canister to adsorb the $H_2O$ and $CO_2$ content, passing the air issuing from the third canister through said first canister to desorb $H_2O$ in the latter, heat being added to the air entering the first canister to replace heat lost in the system, returning the moist air from the first canister to the cabin, and simultaneously connecting said second canister to vacuum to exhaust the $CO_2$ content of the latter; and repeating the three-stage cycle continuously.

References Cited

UNITED STATES PATENTS

| 3,130,021 | 4/1964 | Milton | 55—62 |
| 3,150,942 | 9/1964 | Vasan | 55—31 |
| 3,164,454 | 1/1965 | Wilson | 55—68 |
| 3,206,918 | 9/1965 | Robinson | 55—179 |
| 3,221,477 | 12/1965 | Arnoldi et al. | 55—75 |

REUBEN FRIEDMAN, *Primary Examiner.*

SAMIH N. ZAHARNA, *Examiner.*

C. N. HART, *Assistant Examiner.*